3,338,911
PROCESS FOR THE PREPARATION OF α,α-
DISUBSTITUTED SUCCINIMIDES
Helmut Schäfer, Kayhude, Germany, assignor to Desitin-
Werk Carl Klinke G.m.b.H., Hamburg-Fuhlsbuttel,
Germany, a corporation of Germany
No Drawing. Filed June 24, 1964, Ser. No. 377,513
Claims priority, application Germany, July 4, 1963,
D 41,897
11 Claims. (Cl. 260—294.7)

The present invention relates to a process for the preparation of α,α-disubstituted succinimides.

It is already known to prepare α,α-disubstituted succinimides by reacting α,α-disubstituted succinic acids or anhydrides or esters thereof with ammonia or urea. α,α-Disubstituted succinic acids are prepared by starting from α,α-disubstituted succinic acid dinitriles or their β-carbalkoxy derivatives which are accessible by condensation of ketones with cyano-acetic acid esters and subsequent reaction of the α-cyano-β,β-dialkyl-acrylic acid esters obtained with hydrogen cyanide or alkali cyanides. The α,α-disubstituted succinic acid dinitriles or their β-carbalkoxy derivatives are then saponified with strong acid to form by decarboxylation α,α-disubstituted succinic acids. Conversion of the α,α-disubstituted succinic acids to the corresponding succinimides is effected either directly by heating with ammonia to 100–350° C. via the mono or diammonium salt as intermediate, or after conversion into the corresponding succinic acid anhydride by reaction with ammonia under the same conditions via the semi-amide or the ammonium salt of the semi-amide as intermediate.

It has also been suggested to convert α,α-spiro-heptamethylene succinic acid anhydride into the corresponding succinimide by melting it together with urea at 130°–160° C.

The above-mentioned processes have the disadvantage that during saponification, nitrogen is totally removed from the substituted β-carbalkoxy succinic acid dinitriles and subsequently part of it is reintroduced into the molecule in one or two further process steps. Moreover, the yield obtained with the known procedures is unsatisfactory.

It has now surprisingly been found that by reacting α,α-disubstituted succinic acid dinitriles with hydrogen halides and alcohol, the desired α,α-disubstituted succinimides are readily obtained in one process step and in good yield.

Thus the present invention provides a process for the preparation of α,α-disubstituted succinimides which comprises reacting a succinic acid dinitrile having the general formula

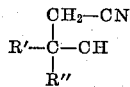

wherein R' and R" are independently from each other unsubstituted or substituted alkyl, aralkyl or aryl groups or represent in combination a cyclic rest, with a hydrogen halide, preferably hydrogen chloride, and an aliphatic or cycloaliphatic alcohol at a temperature in the range of −20° to +100° C., optionally in presence of a solvent, and separating from the reaction mixture the corresponding α,α-disubstituted succinimide having the general formula

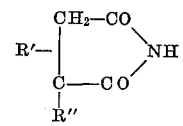

wherein R' and R" correspond to above definition. Preferably 2 to 5 mols of alcohol are used in the reaction per mol of dinitrile. Furthermore it is useful first to introduce the hydrogen halide at a temperature between −20° and +20° C. into the solution of dinitrile in anhydrous alcohol and subsequently heat the mixture to higher temperatures. Whereas in the beginning the reaction should be carried out in absence of water, in the heating phase presence of water is allowed.

Besides the desired α,α-disubstituted succinimide, the process of the invention yields ammonium halide and the alkyl halide corresponding to the alcohol employed as by-products. The alcohol participating in the reaction serves also as solvent. If desired, also further solvents may be employed. In the beginning, the reaction is *exothermic*, later on heating is necessary for its completion.

Excess hydrogen halide escapes during heating the reaction mixture and may be collected in a known manner and recycled into the process of the invention. Part of the hydrogen halide reacts with the alcohol used to form alkyl halide.

The yield of the process of the invention exceeds in most cases 80% of the theory and in same cases 90% of the theory.

The easy formation of the substituted succinimide under the conditions of the process of the invention is highly surprising since according to the prior literature one would expect the substituted succinic acid dinitrile to react in presence of hydrogen halide with excess alcohol to form the corresponding succinic acid diester or a succinic acid nitrile ester (see Houben-Weyl, Methoden der organischen Chemie, 1952, vol. 8/III, pages 536–540; R. Roger, D. G. Neilson, Chem. Reviews, 61, 192–193, 1961).

The disubstituted succinimides prepared according to the invention are valuable pharmaceuticals having anticonvulsive properties.

The present invention is illustrated by the following examples but is not limited thereto.

*Example 1*

(1-cyano-cyclopentyl-1)-aceto nitrile was prepared the following way:

A solution of 268.5 g. of cyclopentylidene cyano-acetic acid ethyl ester—prepared according to the method by A. C. Cope et al., J. Amer. Chem. Soc. 63, 3452 (1941)—in 225 ml. of ethanol was added with efficient stirring to a solution of 102.5 g. potassium cyanide in 275 ml. water preheated to 40° C., the addition being such that the temperature of the mixture did not exceed 50° C. After the addition was completed, the mixture was kept at 50° C. for 1 hour and subsequently refluxed for 3 hours. Then 300 ml. aqueous ethanol were distilled off from the reaction mixture at normal pressure. In the residue, the desired dinitrile separated from the aqueous phase. After washing of the aqueous phase with toluene, the combined organic phases were dried with potash and distilled.

A yield of 184 g. = 91.6% of the theory of (1-cyanocyclopentyl-1)-aceto nitrile having a boiling point B.P.$_{13}$ 149° to 150° C. was obtained.

Example II

An amount of 100 g. gaseous hydrogen chloride was introduced with stirring and efficient cooling into a solution of 68 g. of α-methyl-α-propyl succinic acid dinitrile (obtained in analogy to Example I) in 150 ml. of anhydrous methanol. After aging for about 12 hours, the reaction mixture was slowly heated to 50° C. and then refluxed for 4 hours. After cooling, the precipitated ammonium chloride was filtered off and the filtrate was evaporated under vacuum. The residue was distilled under reduced pressure.

A yield of 70 g.=90.5% of the theory of α-methyl-α-propyl-succinimide having a boiling point B.P.$_6$ 147° to 150° C. was obtained. After recrystallization from water, the product showed a melting point of 80° to 81° C.

Example III

In accordance with Example II, a solution of 61 g. α-methyl-α-ethyl succinic acid dinitrile (obtained in analogy to Example I) in 100 ml. anhydrous methanol was reacted with 102 g. hydrogen chloride. The mixture was worked up yielding 64.1 g.=91% of the theory of α-methyl-α-ethyl succinimide having a boiling point B.P.$_{12}$ 146° to 150° C. After recrystallization from diisopropyl ether the product had a melting point of 45° to 46° C.

When using n-butanol or ethylene glycol monomethyl ether instead of methanol, the reaction proceeds the same way except that yields are somewhat lower.

Example IV

In accordance with Example II, a solution of 67 g. (1-cyano-cyclopentyl-1)-aceto nitrile (prepared according to Example I) in an anhydrous mixture of 130 ml. ethanol and 20 ml. dioxane was reacted with 105 g. hydrogen chloride. After aging at 0° C. for 1 week, the reaction mixture was worked up yielding 62 g.=81% of the theory of spiro-cyclopentyl-(1,3'-)-succinimide which after recrystallization from water had a melting point of 121° to 122° C.

When using cyclohexanol instead of ethanol, the reaction proceeds the same way except that a lower yield is obtained.

Example V

In accordance with Example II, a solution of 85 g. α-methyl-α-phenyl succinic acid dinitrile in a mixture of 150 ml. methanol and 15 ml. chloroform was reacted with 110 g. hydrogen chloride. The reaction mixture was worked up yielding 75.9 g.=80.3% of the theory of α-methyl-α-phenyl succinimide which after recrystallization from methanol had a melting point of 83° to 84° C.

Example VI

A solution of 80 g. of α-p-chlorophenyl-α-methyl succinic acid dinitrile in 120 ml. of methanol was saturated at −5° C. with 76 g. of gaseous hydrogen chloride. After 24 hours aging at 0° C., the solution was slowly heated and then refluxed for 4 hours. After cooling, the precipitate was separated by suction and thoroughly washed with water. An amount of 74.5 g.=85% of the theory of α-p-chlorophenyl-α-methyl succinimide was obtained having a melting point of 148° C. (after recrystallization from ethanol).

Example VII

A solution of 7.5 g. [(1-methyl-4-cyano-pipericyl)-4] acetonitrile in 75 ml. of methanol and 1 ml. of dioxane was saturated at 0° C. with gaseous hydrogen chloride according to Example 6. After 40 hours aging at 0° C., the solution was slowly heated and then refluxed for 4 hours. The precipitate was separated in the heat by suction whereby 8.0 g. of 8 - methyl - 2,8 - diazaspiro(4,5) - decane-1,3-dione=79.5% of the theory were obtained as hydrochloride. After recrystallization from methanol 60%, the compound had a melting point of 325° C.

As mentioned, in the formula given above R' and R" can be equal or different and may be alkyl, aralkyl, or aryl. The alkyl groups comprise straight-chain and branched aliphatic groups containing 1 to 10 carbon atoms such as methyl, ethyl, propyl, butyl, amyl, hexyl, heptyl, octyl, nonyl, decyl; also alkyl groups with higher carbon numbers are suitable.

The aralkyl groups comprise benzyl, β-phenylethyl, γ-phenylpropyl, p-chlorobenzyl, and the aryl groups comprise phenyl, o-chlorophenyl, m-chlorophenyl, p-chlorophenyl, p.methoxyphenyl and pyridyl.

When R' and R" in combination are a cyclic group, it is started from compounds having the general formula $$\begin{array}{c} CH_2-CN \\ | \\ CH_2-C-CN \\ | \\ (CH_2)_n-CH_2 \end{array}$$

wherein n can be 2 to 5; in this case 2-azaspiro (4,4)-nonane-1,3-dione or, respectively, the corresponding decane, undecane, or dodecane compound is obtained.

The combined cyclic group may also be heterocyclic and substituted such as e.g.:

$$X-N\begin{array}{c} CH_2-CH_2 \\ \diagdown \\ CN_2-CN_2 \end{array}\begin{array}{c} CH_2-CN \\ \diagup \\ C-CN \end{array}$$

wherein X is a $C_1$–$C_4$ alkyl or an aryl such as e.g. methyl or benzyl; in this case, e.g. 8-alkyl-2,8-diazaspiro(4,5)-decane-1,3-diones are obtained which are compounds of pharmaceutical interest.

The α-methyl-α-propylsuccinimide obtained according to Example 2 is of interest in pharmaceutical respect.

I claim:
1. A process for the preparation of α,α-disubstituted succinimides comprising reacting a succinic acid dinitrile having the formula

$$\begin{array}{c} CH_2-CN \\ | \\ R'-C-CN \\ | \\ R'' \end{array}$$

wherein R' and R" are alkyl of 1 to 10 carbon atoms, aralkyl, or aryl groups and when in combination together with the adjacent carbon atom form a cycloalkane ring having 5 to 8 carbon atoms, N-lower alkyl-piperidyl or N-benzylpiperidyl, with hydrogen chloride and a member selected from the group consisting of alkanols of 1 to 4 carbon atoms, cyclohexanol, and ethylene glycol monomethyl ether and mixtures thereof, at a temperature of between −20° C. and +100° C., and thereafter separating from the reaction mixture the corresponding α,α-disubstituted succinimide having the formula $$\begin{array}{c} CH_2-CO \\ | \phantom{xx} \diagdown \\ \phantom{xx} NH \\ | \phantom{xx} \diagup \\ R'-C-CO \\ | \\ R'' \end{array}$$

where R' and R" correspond to the above definition.

2. Process according to claim 1 wherein there are used 2 to 5 mols of alcohol per mol of dinitrile.

3. Process according to claim 1 wherein there is first introduced the hydrogen chloride at a temperature between −20° and +20° C. into the solution of dinitrile in anhydrous alcohol and then the reaction mixture is heated to higher temperature.

4. A process according to claim 1 wherein R' and R" are both alkyl of 1 to 10 carbon atoms.

5. A process according to claim 4 wherein R' is methyl and R" is alkyl of 1 to 10 carbon atoms.

6. A process according to claim 1 wherein R' is methyl and R" is aryl.

7. A process according to claim 6 wherein R″ is phenyl.

8. A process according to claim 1 wherein R′ and R″ together with the adjacent carbon atom are cycloalkane having 5 to 8 carbon atoms.

9. A process according to claim 8 wherein R′ and R″ together with the adjacent carbon atom are a cycloalkane having 5 carbon atoms.

10. A process according to claim 1 wherein R′ is methyl and R″ is N-methyl piperidyl.

11. A process according to claim 1 wherein R′ is methyl, R″ is alkyl and the alcohol is cyclohexanol.

References Cited
FOREIGN PATENTS

| | | |
|---|---|---|
| 725,812 | 3/1955 | Great Britain. |
| 726,069 | 3/1955 | Great Britain. |

OTHER REFERENCES

Sircar: J. Chem. Soc., pages 1252–6 (1927).

ALEX MAZEL, *Primary Examiner.*

JOSE TOVAR, *Assistant Examiner.*